Patented Apr. 29, 1941

2,239,880

UNITED STATES PATENT OFFICE 2,239,880

MANUFACTURE OF SILICATES

Daniel B. Curll, Jr., Philadelphia, Pa., assignor to Philadelphia Quartz Company, Philadelphia, Pa., a corporation of Pennsylvania No Drawing. Application January 14, 1937, Serial No. 120,629

14 Claims. (Cl. 23—110)

This invention relates to manufacture of silicates; and it comprises a process of making silicates substantially free from impurities derived from the containers in which they are manufactured, said process comprising mixing silica with a salt (usually an alkali metal salt) having an acid radical capable of being volatilized at high temperatures, said volatilization resulting in the raising of the fusion temperature of the mixture, that is, the temperature at which a melt will form, either with or without the aid of a reducing agent, and roasting or calcining the mixture in a container, which may be a container subject to attack by molten silicates, under conditions quickly producing substantially complete reaction and elimination of the volatile acid radical, the temperature being raised during the process as the said radical is volatilized and eventually exceeding the temperature at which the initial mixture will form a melt when rapidly heated, the time-temperature relationship of the heating procedure being such that the formation of a melt is prevented, thereby producing a pumiceous, silicate product of high purity. More specifically, the process of my invention comprises mixing an alkali metal carbonate, such as sodium carbonate, with silica, usually in a molecular ratio ranging from about $2Na_2CO_3:1SiO_2$ to $1Na_2CO_3:2SiO_2$, and heating a substantial charge of this mixture without fusion in a container which may be subject to attack by molten silicates, to temperatures starting at about 600° C. and increasing during the process as the $CO_2$ is volatilized up to temperatures above those at which the initial charge will form a melt when rapidly heated under conditions producing the elimination of substantially all the $CO_2$ from the carbonate without producing fusion of any of the ingredients of the reaction mixture, thereby producing a sodium silicate product of non-vitreous appearance and of high purity, either in pulverulent form or slightly caked but capable of being readily crushed into a powder. The invention further comprises the silicate products produced by the said process, said products being porous, powdery materials having a non-vitreous appearance and usually having a ratio of $Na_2O$ (for example) to $SiO_2$ ranging from about 2:1 to 1:2, being readily soluble in water at ordinary temperatures, being purer than the silicates made by other commercial methods and also having desirable physical properties not heretofore obtainable; all as more fully hereinafter set forth and as claimed.

Sodium silicates have been manufactured commercially for nearly a century. One of the earliest of the various methods employed in their manufacture involved the fusion of a mixture of sodium carbonate and sand. And at present substantially the entire commercial production of sodium silicates is based on this well-known process. In this process a mixture of sodium carbonate and sand is fused in a reverberatory tank furnace. The sodium silicates produced are invariably contaminated with impurities derived from the refractories of the furnace in which they are melted. The more alkaline the silicate produced, the greater becomes the attack on the furnace. This reactivity of the molten silicate with the refractory establishes a practical upper limit for the $Na_2O$ content of the silicates produced by this method, in furnaces lined with the usual refractories, this upper limit corresponding substantially to the ratio $1Na_2O:1.5SiO_2$. Manufacture of so-called anhydrous sodium metasilicate by the fusion of soda ash and silica is known, but in this process specially constructed furnaces must be employed which are designed to withstand the corrosive melt which is produced. This melt, moreover, is difficult to handle owing to its low viscosity. These difficulties are so great that the product commonly sold as anhydrous metasilicate usually has a ratio of $Na_2O$ to $SiO_2$ of about 1:1.2 rather than 1:1.

In another commercial process sand is added to an excess of fused caustic soda. This process is used only for the production of sodium silicates in which the ratio of $Na_2O$ to $SiO_2$ is considerably above 1:1, since, as the proportion of $Na_2O$ to $SiO_2$ approaches 1 to 1, sand is decomposed with increasing difficulty. The sodium silicates of intermediate alkalinity, that is, with ratios of $Na_2O$ to $SiO_2$ in the neighborhood of 1 to 1, are commonly made commercially by dissolving in water the product having a silica ratio of 1:1.5 or above, which is obtained in the sodium carbonate fusion process, and causticizing the solution with caustic soda. This dual process, involving the use of caustic soda, appreciably increases the cost of these products of intermediate alkalinity, since caustic soda is considerably more expensive than soda ash. Moreover, if a dry or commercially useful concentrated product is desired, the causticized solution must be evaporated. There has thus been an important demand in this art for many years for an economical commercial method of producing silicates in pulverulent, anhydrous, readily soluble form having a ratio of $Na_2O$ to $SiO_2$ of 1 to 1 and higher with respect to alkali, directly from soda ash.

It will be noted that, in all of the commercial methods of manufacturing alkali metal silicates, the reaction mixture passes through a molten state. In all cases melts are produced at temperatures considerably exceeding the fusion points of the final products. These melts are highly corrosive towards all ordinary refractories and the products obtained are invariably contaminated with impurities derived from the furnace refractory. Moreover, the products require grinding or some special treatment in order to produce a satisfactory commercial material. In these processes the $CO_2$, which is evolved from the carbonates employed, tends to become trapped in the liquid melts. The removal of this $CO_2$ necessitates prolonged heating and the use of temperatures sufficiently high to produce low-viscosity melts from which the $CO_2$ will bubble off.

Various investigators have experimented with mixtures containing $Na_2O$, $SiO_2$, and $CO_2$ in attempts to determine equilibrium conditions and to establish the minimum temperatures at which reaction occurs between soda ash and finely ground silica. In these investigations mixture of soda ash and silica have been heated in platinum crucibles at various predetermined temperatures without agitation and the progress of the reaction has usually been estimated by measuring the evolution of the $CO_2$, it being assumed that the reaction was completed as soon as the $CO_2$ was completely driven off. Several investigators have reported completion of the reaction between soda ash and silica at temperatures below those at which fusion takes place but the products obtained in this manner have been, for the most part, partially vitrified, incompletely soluble in water and leaving a residue of unreacted silica.

Surprisingly, it appears that no specific attempts have been reported of efforts made to determine whether or not sodium silicates can be produced from sodium carbonate and silica under commercial conditions at temperatures below those at which fusion occurs. Perhaps this can be explained by the fact that the description of the products obtained during the reported laboratory investigations has not been such as to indicate that saleable products could be produced in this fashion and also to the fact that the processes, as reported, have involved heating of finely ground materials over long-time intervals. The lack of commercial interest in this non-fusion method is also doubtless due to the fact that fusion has always been considered necessary for complete reaction and elimination of $CO_2$ in the silicate industry as well as in the allied ceramic and glass industries. The well-known difficulties involved in completely removing the $CO_2$ from molten reaction masses would not tend to indicate the feasibility of any process operating at lower temperatures.

I have found, however, that sodium carbonate and silica can be reacted completely and rapidly under commercial conditions and in contact with ordinary furnace refractories or other materials subject to attack by molten silicates, at temperatures increasing during the process but maintained considerably below those at which the reaction mass fuses, that is, forms a melt. At these temperatures the refractory remains unattacked and a dry, powdery or slightly caked product is obtained in one step, this product being porous, pumiceous, of high purity and readily soluble in water. I have found further that this new non-fusion method can be carried out with substantially complete conversion of the reacting chemicals provided the relative quantities of these chemicals are maintained within a range of molecular proportions of from about $2Na_2CO_3:1SiO_2$ to $1Na_2CO_3:2SiO_2$. The $CO_2$ is eliminated from the porous charge more readily than from the melts produced in the fusion processes since it is not required to penetrate a layer of viscous liquid or to bubble off from this liquid.

Surprisingly, I have found it possible to conduct my process with the so-called "glass sand" of ordinary fineness, or even with coarse sand up to about 10 mesh in size, in contrast to the finely ground materials which have been used and considered necessary in the described laboratory experiments. I have found that it is possible to greatly speed up the rate of reaction by agitation of the reacting materials. Agitation also produces a finely-divided granular product which appears to be free from vitrified material and of low density.

The purity of the product obtained in this process is very high. The purity of the crude product, prior to any purification procedure, is limited, in fact, only by the impurities which are present in the sand. Commercial grades of sodium carbonate can be obtained of high purity, and, if a sand which is substantially free from impurities is employed, it is possible to obtain a product of substantially higher purity than can be obtained by the commercial fusion processes. This is due to the fact, mentioned previously, that in these fusion processes there is always an appreciable attack upon the furnace refractory and, since such refractories, fire clay refractories, for example, invariably contain iron and alumina, the silicates produced also contain these materials as impurities.

The present process is capable of producing silicates from all metal salts, having acid radicals capable of being volatilized during the process. These salts can be reacted in a similar manner with the production of corresponding alkali metal silicates. With some of these salts, such as the sulfates and phosphates, the presence in the reaction zone of a reducing agent, usually a reducing gas, is necessary. But silica alone is capable of reacting with salts of most of the other common acid radicals with the exception of the chlorine containing radicals.

That sand and soda ash grains as large as 10 mesh can be employed in the present process is highly unexpected and unpredictable from any previous experience in this art. The mechanism by which such discrete particles can react to completion with the production of a uniform product, even though surface contact must be of necessity non-uniform, is difficult to comprehend. Obviously, a considerable proportion of the grains of soda ash must be entirely out of contact with the grains of silica and vice-versa. Just how these separated grains can come into contact with each other and then react uniformly to produce a uniform product, even without agitation being supplied, is difficult to see. Also, it is difficult to understand how the alkali derived from the soda ash can penetrate sand grains of appreciable size below fusion temperatures. It is believed quite possible that, whatever the actual mechanism involved in the reaction, this mechanism operates or occurs much more readily when the reaction is conducted under commercial conditions, that is, when the materials are reacted in the form of a substantial charge of the order of 10 pounds or over, than when a charge of a few grams is heated in a laboratory crucible. This may account for the greater rapidity and completeness of the reaction when conducted under commercial conditions. But, whatever the true explanation, I have found it possible under commercial operating conditions to obtain a substantially complete reaction between soda ash and glass sand within less than an hour at temperatures below those at which any substantial sintering takes place; a result totally unpredictable from the reported laboratory experiments mentioned previously.

The technique of carrying out the commercial process varies according to the salts or metallic oxides which may be used to form the basic constituents of the silicate. These variations will be obvious to those skilled in the art, and can be accurately predicted from a knowledge of the melting points of the salts or oxides and the melting points of the products, provided the principles outlined in the examples given below are recognized.

If sand and sodium carbonate constitute the ingredients of the batch, I have found that for best results a rather definite temperature-time schedule during the heating should be followed. If heated too rapidly at the start, the reaction mass tends to fuse on the surface owing to the fact that it contains too high a proportion of $CO_2$. This fusion interferes with the proper transfer of heat and evolution of the $CO_2$, and thus delays the reaction. It is evident that, at the start of the reaction, the components of the system may be expressed as $Na_2O$, $SiO_2$, and $CO_2$. The $CO_2$ markedly reduces the melting point of the reaction mass. This means that, the less the $CO_2$ present, the closer the temperature can approach to the melting point of the final silicate product. The temperature should be raised at such a rate that the reaction mass remains substantially granular, or at least so that it does not ball and cling to the container or agitator arms, etc. If balling and sticking occur, the container is attacked. After the bulk of the $CO_2$ has been driven off it is then possible and desirable to heat the reaction mixture to temperatures above the melting point of sodium carbonate, at which temperatures fusion would otherwise take place. A starting temperature of from about 600° to 700° C. has been found satisfactory. The use of higher temperatures, approaching the melting point of the final product, towards the end of the heating step, speeds up and insures completion of the reaction to a marked extent.

It is possible to obtain the desired initial heating at low temperatures by introducing the reaction mixture at the cool end of a furnace and gradually working the mixture towards the point of maximum temperature, making sure that sufficient time is afforded for the bulk of the $CO_2$ to be evolved before the latter point is reached.

The temperature-time schedule to be followed for optimum results varies to some extent with the ratio of the reaction mixture. Of course, the higher the sodium carbonate in the mixture, the slower the rise of temperature should be. If the process is started at a temperature of about 700° C. or below, a temperature rise of from 1 to 10° C. per minute, up to a temperature of about 850° C. has been found suitable, when agitation is not employed. The temperature can be raised at a more rapid rate as soon as the bulk of the $CO_2$ has been evolved. The rate of heating can also be increased when agitation is used, since this greatly increases the rate of evolution of the $CO_2$. For best results the temperature should be raised at a rate roughly proportional to the rate of evolution of the $CO_2$; that is, the temperature should be raised progressively as the $CO_2$ is progressively evolved. As a rough guide it can be said that the temperature of the mixture should not exceed about 850° C. before the $CO_2$ in the mixture has been reduced to below about 15 per cent. by weight. At no time during the process should the temperature rise above that of incipient fusion, if a non-clinkered product is desired.

My process can, of course, be conducted by heating the charge at substantially constant temperatures, these temperatures being below those producing any substantial fusion of the charge. The time consumed in this process is usually somewhat greater than that required when a temperature rise is employed. It has been found, for example, that an equimolecular mixture of sand and of sodium carbonate can be substantially completely reacted when held at a temperature of 800° C. without agitation for a period of 48 hours, no more than 1 per cent. of carbon dioxide remaining in the reaction product. When equimolecular mixtures of $Na_2CO_3$ and coarse sand are heated at 900° C., less than 1 per cent. of $CO_2$ remains in the product after 75 minutes. When heated at 1000° C. this mixture contains less than 1 per cent. of $CO_2$ after only 30 minutes. These results were obtained without the use of agitation. Experiments indicate that the reaction proceeds at an appreciable rate at temperatures as low as about 700° C. and, if agitation is employed, it is possible to obtain a silicate at such a temperature. For commercial production of sodium silicate, however, a minimum temperature of about 800° C. is more practical in case the temperature of the charge is maintained substantially constant.

There are several advantages obtained by the use of low reaction temperatures. There is less attack upon the furnace at low temperatures and, of course, furnaces operated at these temperatures have an appreciably longer life. Any cake formed during the process is more fragile when lower temperatures are employed and the product obtained is more porous and, in the case of sodium, potassium, lithium, or other alkali metal silicates, more rapidly soluble. Below 750° C. the product of a sodium carbonate-silica batch is always a loose, free-flowing powder. And at lower temperatures agitation can be provided more easily owing to the fact that many metals and alloys can be employed in the construction of rakes, furnace parts, etc. which would be inoperative at higher temperatures, such as 1000° C., for example. The advantages due to more efficient fuel ratios are considerable. Due to a wider spread between theoretical flame temperatures and batch temperatures, better heat transfer and lower radiation losses, the increase in efficiency is much greater than would be indicated by the simple mathematical ratio of fusion temperatures to temperatures used in the present process.

The upper limit of temperature to be employed in my process is determined by the fusion temperature of the reaction mass. This temperature depends upon the composition of the reaction mass, the rapidity of heating, etc. It is always lower than the melting points of the resulting silicates which are formed in the process. Sodium metasilicate melts at 1088° C., sodium disilicate at 878° C., and sodium orthosilicate melts or decomposes at about 1118° C. It is advantageous to operate the process at temperatures below those producing incipient fusion, in order to obtain a pulverulent, non-vitrified, porous product, or an easily pulverized cake. By "temperatures of incipient fusion," I mean temperatures at which some of the original solid constituents of the charge remain solid but at which sufficient melt is formed to cause parts of the charge to creep, to ball up, and to stick to other parts, to agitator arms, to the container, etc. The product obtained at these temperatures is a frit. It is sometimes porous, being soft and semi-plastic when hot but having appreciable crushing strength when cold and, when broken, it yields sharp, angular particles which contain vitrified material. In general, the higher the proportion of sodium carbonate in the reacting mixture the higher the final temperature required to completely drive out the carbon dioxide, and the slower the temperature must be raised to prevent fusion. The optimum range of reaction temperatures for different compositions of the reaction mass are about as follows: 600° to 860° C. for a composition of $1Na_2CO_3:2SiO$; 600° to 875° C. for a composition of $1Na_2CO_3:1.5SiO_2$; 600° to 1000° C. for a composition of $1Na_2CO_3:1SiO_2$; 600° to 1000° C. for a composition of $1.5Na_2CO_3:1SiO_2$ and 600° to 1000° C. for a composition of $2Na_2CO_3:1SiO_2$.

Unless the higher temperatures within the above ranges are reached it is generally not necessary to slow down the normal rate of heating obtained in furnaces of the usual type. For example, if the highest furnace temperature is 900° C. an equimolecular mixture of sodium carbonate and sand can be introduced directly into the hottest part of the furnace without fusing. The natural lag of the temperature under these conditions, amounting probably to about 10 minutes is sufficient. But if the highest furnace temperature is 1000° C. it is usually necessary to introduce the mixture into a cooler part of the furnace in order that part of the carbon dioxide shall be evolved before the reaction mass reaches the highest temperature.

It is advantageous to conduct my process in a continuous manner, for example, in a Herreshoff furnace, in a tunnel kiln or in a rotary drum furnace of the type used in burning cement and lime. In the Herreshoff furnace the charge is raked over a series of hearths, placed so that the product of the first hearth is feed for the second. In the tunnel furnace the charge is usually carried on a conveyor or in cars from one end of the furnace to the other. Agitation may be supplied if desired. In the rotary furnace agitation is, of course, supplied continuously and the tumbling action keeps the charge well mixed at all times. The temperature rise through these furnaces and the rates of travel of the charge can be controlled readily in order to produce the desired rate of reaction with avoidance of any substantial softening or balling of the product. When carbonates are used or alkalies having a strong affinity for $CO_2$, it is advantageous to pass the charge through the furnace in counter current to a gas having a low $CO_2$ content, which gas sweeps the evolved $CO_2$ out of the furnace and thus speeds up the reaction. The same principle, of course, applies in the case of sulfates and nitrates. It may be mentioned that no known process of silicate manufacture has ever before made the use of a tunnel kiln possible or practicable.

In the present process it is possible to vary the proportions of sand and of sodium carbonate in the charge outside of the range of proportions mentioned above but, if this is done, the reaction is not usually complete. For example, if more sand is used than corresponds to the molecular ratio of $1Na_2O:2SiO_2$, the reaction usually is not complete and uncombined sand is found in the reaction products. Even when the amount of sand used is increased slightly above the molecular proportions of $1Na_2O$ to $1.5SiO_2$ it becomes somewhat difficult to obtain complete reaction below fusion temperatures, which may be due to the fact that sodium disilicate crystallizes much more slowly than the metasilicate. Thus, when 1 mole of sodium carbonate is heated with 2 moles of sand at a temperature of 860° C. the product fuses to some extent, although the melting point of sodium disilicate is known to be 878° C. The product obtained in this manner contains a considerable amount of metasilicate crystals as well as unreacted sand.

If the sodium carbonate is increased in the reaction mixture above the molecular proportions of $2Na_2CO_3$ to $1SiO_2$, it is difficult to prevent fusion and the reaction is usually incomplete. Thus, if two moles of sodium carbonate are heated with one mole of sand at a temperature of about 900° C., a fragile caked product is formed but, if the temperature is raised rapidly to 950° to 1000° C., fusion takes place. This fusion can be completely avoided provided the charge is heated slowly to reaction temperatures in order to afford time for the $CO_2$ to be evolved.

A valuable detergent product can be produced by roasting silica with a substantial excess of soda ash, for example, in proportions such that the soda ash exceeds the ratio of $2Na_2CO_3:1SiO_2$, until the silica has become converted to a silicate, without attempting to remove all the $CO_2$ from the product. The production of such a product is within the scope of the present invention.

For the production of the more highly alkaline products having ratios which approach or exceed $2Na_2O:1SiO_2$ one expedient which can be employed is to heat a charge initially containing sodium carbonate and sand in a substantially equimolecular ratio. Then, after reaction has occurred, it is possible to mix in more sodium carbonate and to allow additional time for rection without fusion occurring. Another method is to mix the charge with part of the product from a previous run or with sodium metasilicate in sufficient proportions to prevent fusion. By these methods higher temperatures can be employed and products of higher alkalinity obtained. As an example, it has been found possible to employ temperatures in the neighborhood of 1000° C. with a mixture of 2 moles $Na_2CO_3$ and 1 mole $SiO_2$ without fusion, provided the $CO_2$ in the batch does not exceed about 5 per cent. by weight. It has been found that the $CO_2$ can be reduced to the desired extent if the reaction mixture is heated very slowly to the higher temperatures. The non-fusion reaction of this invention appears to proceed best, however, when the sodium carbonate and sand are heated in substantially equimolecular proportions.

There appear to be at least three factors, aside from the temperature, which affect the speed of the reaction in the present process, namely, the partial pressure of evolved gases in the furnace, the grain size of the reacting materials, and the degree of agitation employed. With respect to the partial pressure of carbon dioxide in the furnace it has been found that, when this partial pressure amounts to 1 atmosphere, the rate of reaction is still satisfactory. It is possible to employ an electric furnace in this process and, if desired, the furnace may be evacuated to reduce the partial pressure of the gas or gases. If it is not desired to collect the evolved gas or gases, an ordinary gas or oil-fired furnace may be employed in the process, and it has been found that the combustion gases dilute the evolved gas sufficiently to permit a rapid reaction. For best results it is desirable to pass gases having a low content of $CO_2$, such as flue gases, superheated steam or air, through the furnace in order to sweep out the $CO_2$ which is evolved during the process when carbonates are used. The reaction proceeds in the presence of water vapor and, in fact, a small quantity of water vapor tends to speed up the reaction, although the presence of water is not known to be necessary to the reaction.

In regard to the particle size of the sand and of the salt, it has been found, as stated previously, that quite coarse particles can be employed in the process, that is, sand or sodium carbonate up to about 10 mesh, which corresponds to grains having average diameters below 1.65 mm. Most of the present experimental work has been carried out with ordinary silica sand having a grain size such that about 50 per cent. is between 35 and 60 mesh per inch. It has been found, however, that the use of finely pulverized sand speeds up the reaction, probably because of the increased surface exposed. Most of the soda ash sold commercially is finely divided. But it is possible to employ 10-mesh soda ash particles without slowing up the reaction seriously.

As mentioned previously, the reaction is speeded up if the reaction materials are agitated or stirred during the process. This assists in the elimination of the volatile constituents, for example, sulfates, carbonates, water, etc., and produces a granular or finely divided product. However, the type of product formed depends to an important extent upon the temperatures employed. At the maximum temperatures within the present invention a slight amount of agglomeration takes place. The size of the particles formed can be controlled to some extent by the degree and type of agitation. A powdery, free-flowing product can be obtained provided the temperatures are not too high and agitation is sufficient. When no agitation is used in the process I have found that, if the reacting layer is not over about 2 to 3 inches thick, the reaction is completed within a reasonable time interval. In other words in order to produce an economical rate of reaction the process must be conducted under conditions producing a uniform distribution of temperature throughout the reaction mass. There is some caking or agglomeration of the product but this cake is quite frangible provided temperatures of incipient fusion are not exceeded. The cake can usually be crushed between the fingers.

Any of the common refractories can be employed in the furnaces used in the present process. The containers or crucibles in which the charges are heated can be made of materials which are subject to attack by molten silicates, such as cast iron, sand, cement, the ceramic refractories, etc. which are not available when fusion processes are used.

The soluble silicate products obtained in the present process have the advantage that they can be readily purified. When dissolved in water any residues of unreacted sand remain undissolved and may be filtered off. This filtration step also removes the bulk of any iron and alumina impurities derived from the sand. Ordinary glass sand contains roughly 0.06 per cent. $Fe_2O_3$ and 0.5 per cent. $Al_2O_3$. When the usual fusion processes are employed, these impurities are rendered soluble but in the present process they remain in insoluble form, when the product is dissolved, provided the temperature of the solution is not raised above about 60° C. They can then be removed by simple filtration. It is also possible to build up the concentration of the solutions to 20 per cent. or more of $Na_2O$ thereby precipitating any residues of unreacted sodium carbonate from the solutions, this precipitate being filtered off to leave a substantially carbonate-free product. Sodium carbonate is substantially insoluble in sodium silicate solutions having concentrations above 20 per cent. $Na_2O$ by weight. If the process is operated with an amount of sodium carbonate above the proportions of $2Na_2CO_3:1SiO_2$, the unreacted carbonate in the product can be removed conveniently by this method. It is thus possible to remove substantially all of the impurities from solutions of the reaction products of this invention by a single filtration. The present process thus has two important advantages, first, the production of a crude product of considerably higher purity than that obtained in the fusion processes, and, second, the production of a product more easily freed from such minor quantities of impurities as may be derived from the raw materials used in its manufacture. The use of pure raw materials and the purification of available materials has always been a serious problem in the manufacture of silicates. This process, which leaves the impurities in a relatively insoluble form while the desired reaction takes place, permits the use of commonly-occurring raw materials, particularly sand, which otherwise would be considered unavailable.

The alkali metal silicates obtained in the present invention are somewhat hygroscopic and they absorb $CO_2$ from the air with considerable rapidity. These products should therefore be protected from the air as much as possible to prevent absorption of water and $CO_2$. If the products are not protected from the air as they leave the furnace, for example, an analysis will indicate the presence of $CO_2$ which would normally indicate an incomplete reaction, even though all $CO_2$ was actually eliminated in the roasting process.

When equimolecular mixtures of sodium carbonate and silica are employed in the process, the resulting product is substantially sodium metasilicate in finely divided crystals. When other ratios of sodium carbonate and silica are employed crystals of sodium metasilicate are usually present in the product. These are mixed with crystals of sodium orthosilicate when reaction mixtures rich in sodium carbonate are employed, and with crystals of sodium disilicate when reaction mixtures rich in silica are employed. Crystals of these compounds can be identified in the products by their optical properties. The products also may contain amorphous material.

The following specific examples illustrate several different ways in which the present process can be carried out in actual practice and within the preview of the present invention.

EXAMPLE 1.—*Production of sodium metasilicate*

106 parts of soda ash were intimately mixed with 60.1 parts of glass sand of coarse quality. This batch was roasted at a temperature reaching 900° C. for approximately ½ hour and then removed from the furnace. The fragile cake was broken up, mixed, and returned to the furnace for a second ½ hour period of heating at 900° C. The resulting product was in the form of a readily broken cake. The analysis of the soluble portion of the product which dissolved in hot water within 15 minutes was found to be as follows:

| | Per cent |
|---|---|
| $Na_2O$ | 50.2 |
| $SiO_2$ | 49.7 |
| $CO_2$ | .1 |

There was only a .2% residue retained on a #40 Whatman filter paper after treating this product with boiling water for 15 minutes as described above. Most of this residue consisted of impurities found in the glass sand which was used as raw material.

EXAMPLE 2.—*Sodium silicate of ratio* $1.5Na_2O:1SiO_2$ 318 parts of soda ash were intimately mixed with 120.2 parts of coarse glass sand. This batch was roasted at a temperature reaching 875° C. for two hours. The following represents the analysis of the soluble portion of the resulting product:

| | Per cent |
|---|---|
| $Na_2O$ | 56.4 |
| $SiO_2$ | 37.0 |
| $CO_2$ | 6.3 |

It was found that all but 0.4 per cent. of this product dissolved in hot water within a period of 15 minutes. The product was found to contain interlocking crystals of sodium orthosilicate and sodium metasilicate. The slightly caked, porous product could be readily powdered in the hands.

EXAMPLE 3.—*Sodium silicate of ratio* $1Na_2O:1.5SiO_2$ 212 parts of soda ash were intimately mixed with 180.3 parts of coarse glass sand. This mixture was roasted at a temperature reaching 875° C. for a period of 2 hours without agitation. The soluble portion of the resulting product had the following analysis:

| | Per cent |
|---|---|
| $Na_2O$ | 43.0 |
| $SiO_2$ | 56.5 |
| $CO_2$ | 0.4 |

In this case a residue amounting to 13.8 per cent. was left after digestion of the product in hot water for a period of 15 minutes. Most of this residue was unreacted $SiO_2$, which indicates the difficulty of obtaining complete reaction with these proportions of soda ash and sand. This product was found to contain interlocking crystals of sodium metasilicate and sodium disilicate.

EXAMPLE 4.—*Potassium silicate of ratio* $1K_2O:2SiO_2$ 138 parts of potassium carbonate were thoroughly mixed with 120 parts of glass sand. This batch was roasted without agitation at a temperature reaching 750° C. for 12 hours in a layer not over 1 inch thick on the bed of a furnace. The resulting product was found to be a porous cake, slightly agglomerated but capable of being broken down readily to give fine uniform granules. The soluble portion of the resulting product had the following analysis:

| | Per cent |
|---|---|
| $K_2O$ | 46.6 |
| $SiO_2$ | 51.3 |
| $CO_2$ | 2.1 |

A residue amounting to 13.5 per cent. of the batch was left undissolved after digestion with hot water for 15 minutes. In a similar process, employing agitation, it was found that the product was a free-flowing, porous, granular material.

EXAMPLE 5.—*Potassium metasilicate*

138 parts of potassium carbonate were thoroughly mixed with 60.1 parts of glass sand. This batch was heated at a temperature reaching 750° C. for 12 hours. The batch was in a layer not over 1 inch thick on the bed of the furnace and no agitation was employed. The resulting product was found to be slightly agglomerated, but it broke down readily into a fine, uniform, granular form. The soluble portion of the product had the following analysis:

| | Per cent |
|---|---|
| $K_2O$ | 56.2 |
| $SiO_2$ | 31.0 |
| $CO_2$ | 12.8 |

An insoluble residue of 3.7 per cent. was left after digestion of the product in hot water for 10 minutes. In a similar process, in which agitation was employed, it was found that the product remained free-flowing and consisted of slightly porous granules.

It has been found that alkali metal sulfates can be substituted for the carbonates in the above examples with the production of alkali metal silicates, provided a reducing atmosphere is maintained in the furnace. In one specific operation, for example, I passed ordinary illuminating gas over an equimolecular mixture of silica and sodium sulfate while heating the reaction zone to a temperature of 800° C. A fair yield of sodium silicate was obtained in this manner. If an electric furnace is employed in this process, the gases evolved during the reaction, which consist of a mixture of sulfur-containing gases, can be recovered and converted into sulfuric acid.

A considerable portion of the $CO_2$ found in the above analyses may have been due to the absorption of $CO_2$ from the air, since no special precautions were exercised to protect the products from the air.

The novel product obtained in this invention has properties which suggest its utility in a large number of special industrial uses. The present invention makes available sodium silicates having ratios varying from about $2Na_2O:1SiO_2$ to $1Na_2O:2SiO_2$ as cheap industrial chemicals. These silicates represent a very cheap source of alkali which is in highly available form. In comparison with sodium carbonate, for example, the new silicates provide a source of $Na_2O$, approximately 100 per cent. of which is available at pH values of above 9, while only about 50 per cent. of the $Na_2O$ in sodium carbonate is available at these pH values. Thus the metasilicate analyzes 50 per cent. to 51 per cent. $Na_2O$, all of which is "active," while sodium carbonate analyzes 59 per cent. total $Na_2O$ but has only 29 per cent. "active" $Na_2O$. The new silicates will doubtless find much wider use in industry owing to their lower costs.

There are many modifications of the present invention which result in products which are useful in themselves or as intermediates in the manufacture of other materials. The examples above describe two component silicates made by reacting metal salts, alkali metal salts, or alkaline earth salts with silica. It is obvious that mixtures of silicates or silicates of three or more components can also be produced, provided the conditions under which reaction takes place are properly controlled. An alkali metal salt containing an acid radical which is volatilized in the presence of silica at temperatures below fusion may be mixed with alkaline earth oxides or salts and silica and roasted, below fusion temperatures, resulting in the elimination of the volatile acid radical and producing a pumiceous silicate product of high purity.

As an example of this modification, the present invention can be advantageously employed in the production of glass and enamels. In the present glass-making process, there are at least five outstanding difficulties, all of which are reduced or eliminated by the use of my invention. These difficulties are: (1) the segregation of the ingredients of the charge, which occurs in charging hoppers and storage bins; (2) the slow decomposition of the silica during firing; (3) the difficulty of eliminating $CO_2$ from the carbonates contained in the batch; (4) the occurrence of "seeds" due to the non-uniformity of the batch, and (5) the attack on the refractories resulting from the high temperatures which are required when ordinary glass-making methods are used. In making glass by use of the present invention, lime (or calcium carbonate), sand and soda ash are roasted at low temperatures without fusion and under conditions producing a granular or slightly caked product in which large proportions of the silica occur in a readily fluxible form, this product being substantially free from $CO_2$. This intermediate product is then heated to higher temperatures, either in the same or a different furnace, to fusion temperatures. It is possible to utilize the waste heat from the final glass furnace, employed in melting the charge, for roasting the raw materials and production of the intermediate product in accordance with the present invention. The intermediate product can therefore be made very cheaply. The intermediate product fuses at temperatures considerably below those used in the present glass-making process, and a homogeneous glass is formed in a much shorter time. A considerable economy of heat results. And there is less attack on the furnace refractory, resulting in a longer furnace life.

The following example illustrates the method as carried out. 72.5 parts of glass sand were mixed with 18.8 parts of limestone (calcium carbonate) and 29.3 parts of soda ash. This mixture was roasted at a temperature of 700° C. until analysis indicated that the product contained only .05% $CO_2$. The product was a soft, frangible, porous cake and was not fritted or fused, though no agitation was used. This material was crushed and placed in a furnace at 975° C. for three hours. A duplicate sample which had not been pre-roasted was also held for three hours at the same temperature. Analysis of the finely-ground, fused products gave the following results:

|  | Pre-roasted | Regular batch |
|---|---|---|
|  | Percent | Percent |
| Water-soluble portion: |  |  |
| $Na_2O$ | .54 | .82 |
| $SiO_2$ | .65 | .85 |
| $CaO$ | .24 | .26 |
| Acid-soluble portion: |  |  |
| $Na_2O$ | 1.0 | 1.2 |
| $SiO_2$ | .4 | 1.2 |
| $CaO$ | 1.9 | 3.9 |

These data clearly indicate that with a pre-roasted batch the formation of glass proceeds more rapidly than is the case when regular batch is used.

Another method of utilizing the present invention in the making of glass and enamels is to replace the usual soda ash and sand, used in the manufacture of these products, with one of the sodium silicate products obtained in accordance with the present invention. There is then no evolution of $CO_2$ during the firing step, which enables the use of lower firing temperatures and eliminates many of the difficulties involved in this step.

The above described advantages of introducing a pre-roasting step in the manufacture of soda lime glass also hold in the case of boro silicate glasses, lead, and potash glasses, and even in the production of sodium silicate glasses of ratios so high in silica that roasting at temperatures below the fusion point will not completely convert the silica to a soluble form. Since long firing periods are not necessary in producing sodium silicate glasses, the normal silicate furnace, in order to conserve heat and refractories and facilitate changes from one ratio to another is built to carry a rather shallow bed, usually 2 to 3 feet deep. Therefore, there is much less opportunity for mixing due to convection currents, than is the case in the large tank furnaces used to produce soda lime or boro silicate glasses. In the manufacture of sodium silicate glasses in the usual manner, using the normal batch of glass sand and soda ash, with thorough mixing of the dry batch, and with furnace drafts, temperatures and all other known variables constant, the silicate ratio will vary as much as 0.10 from one draw to the next and even between samples in the same draw. For example, a sample of sodium silicate glass has been obtained having a ratio of $Na_2O$ to $SiO_2$ of 1:3.10, and another sample of the same draw has shown a ratio of 1:3.20. It is known that such variations in ratio have a marked effect on the rate of solubility of the sodium silicate glass, and make the action of the dissolver irregular and unsatisfactory. This is especially true if these variations carry the ratio into the range above 1:3.20, which is important due to the wide use of these ratios for adhesive purposes. By pre-roasting the batch of sand and soda ash at suitable temperatures, in accordance with the present invention, so that the reaction will take place without fusion, in a furnace designed to agitate or mix the charge during the roasting process, it is possible to produce an easily-fusible feed of uniform composition which does not segregate in the charging hoppers or in the furnace, and which is practically free from dust and fine particles. When this pre-roasted charge is then fed into the silicate furnace, a much more uniform product results.

The present invention can also be used advantageously in connection with the usual cement-making process, for the introduction of soluble silicates in the product. In order to accomplish this, silica and soda ash are added in suitable proportions and quantities, to cement-making ingredients and this mixture is roasted at temperatures below those at which fusion of the resulting sodium silicate will take place. The finished clinker will then contain soluble silicates which will modify and improve the quality of the cement.

One method of reducing the danger of fusion in my process, especially where temperatures in the higher range are used, is to return a substantial part of the roasted product to the feed end of the furnace. The amount of return may vary from about 0 to 90 per cent., depending on the condition of operation and the form desired in the final product. If a coarsely granulated product is desired, fines may be screened out and returned to be agglomerated at suitable temperatures with new batch. If a finely divided, free-flowing product is desired, this may be accomplished by the use of relatively low temperatures and the return of a sufficient proportion of the product to prevent agglomeration of the particles.

It is obvious, of course, that the new products can be used in many industrial applications in which the more expensive silicates are now used, such as in detergents, cements, adhesives, etc. The new sodium metasilicate of this invention can be readily converted into the form of the hydrate $Na_2O.SiO_2.5H_2O$ or other hydrates by means of steam treatment or by dissolving it in the calculated amount of water followed by crystallization at lower temperatures. The other known hydrates of sodium metasilicate and of sodium sesquisilicate can also be prepared from my new products for example, by dissolving a product having the proper silica ratio in the calculated amount of water, adjusting the alkali content, if required, and then crystallizing at lower temperatures. Many other special uses for the alkali metal silicate products of the present invention will be readily apparent to those skilled in this art.

The alkali metal products of my invention which have a molecular ratio within the range of 2:1 to 1:2 are readily soluble in water, dissolving substantially completely at a temperature of 60° C. in about 10 to 15 minutes. When pulverized to pass through a 65-mesh sieve, they have an apparent density ranging from about 0.6 to 1.0. The sodium metasilicate product contains crystals of this compound in finely divided form, while the more alkaline products also contain crystals of sodium orthosilicate and the less alkaline products contain crystals of sodium disilicate in addition to crystals of sodium metasilicate. They can be distinguished from silicate products of similar composition made by other methods by the fact that they are porous, pumiceous, non-vitreous in appearance, and contain sodium silicates, principally in the crystalline state. They consist of such small interlocked crystals that the product is opaque and the larger granules are oölitic in appearance. When examined under a microscope, the granules are seen to be for the most part in the form of dendrites with crystals radiating from a common center like the seeds of a cockle-bur. When sections of these granules are made and examined under a microscope, it is seen that the centers or cores, from which the crystals radiate, consist of a silicate glass. A few cores can usually be found which contain a trace of unconverted silica. This dendritic arrangement of crystals about cores of a silicate glass readily distinguish my products from those of the prior art. My products may be described as being porous and non-vitreous in appearance. They are usually pulverulent, granular and oölitic. The porous, fragile particles of 10-mesh size made by my method can be easily distinguished with the unaided eye from 10-mesh particles made by grinding a cake of metasilicate crystallized from molten glass, since the latter particles are dense and hard, with very few cavities and a sharp angular structure. If the particles are finer, it is necessary to resort to microscopic examination. The crystals of metasilicate obtained from cooling a fused glass are generally larger than those obtained by my process. A vitreous product obtained by the fusion process can, of course, be easily distinguished from my crystalline product by the use of a polarizing microscope, by the fact that my product shows the phenomenon of birefringence while the vitreous product does not. At low temperatures, the product made by my process is usually pure white, but at temperatures just below incipient fusion, the impurities in the sand, if present in sufficient quantity, give the product a light-blue cast.

While several of the preferred embodiments of the present invention have been described, many modifications can be made in the procedures outlined without departing from the purview of the present invention. It has been found, for example, that the present process is generally applicable for the production of metal silicates from metal salts having acid radicals capable of reacting with silica at elevated temperatures with resultant volatilization of the acid. The salts of the silicate-forming metals which are employed in glass-making are the more important, these including salts of the alkali metals, the alkaline earth metals, copper, lead, cobalt, zinc, etc., and mixtures thereof. A mixed sodium-potassium silicate has been found valuable, for example. The nitrates, carbonates, sulfates, sulfides, phosphates, etc. are applicable. As mentioned previously, a reducing atmosphere in the reaction zone is required when some of these compounds are employed. This reducing atmosphere can be produced by carbon, hydrocarbon oils, hydrogen, cracking still gases, coke oven gases, coal gases, etc. Any of the alkaline metal (i. e. alkali or alkaline earth metal) carbonates can be employed in place of the sodium carbonate used in the described processes, with only such slight changes in technique as are required on account of the different fusion points of the products, the different rates of reaction, etc., these required changes being within the skill of the art. With potassium carbonate it has been found possible to obtain a complete reaction with somewhat higher proportions of $SiO_2$ than $K_2CO_3$ to $2SiO_2$, which may possibly be due to the fact that potassium disilicate crystallizes with greater rapidity than sodium disilicate.

The process of the present invention can be modified by the use of an excess of sand in amount sufficient to prevent substantial sintering of the reacting materials. The resulting reaction product can be leached with hot water to remove the sodium silicate which has been formed and the unreacted sand returned to the process. By this method higher temperatures can be employed in the reaction zone without danger of fusion and a sodium silicate rich in silica results. Agitation may be supplied continuously or intermittently in my process. Other modifications of the present invention which fall within the scope of the following claims will be readily apparent to those skilled in the art.

What I claim is:

1. In the manufacture of sodium silicates, the process which comprises preparing a mixture consisting substantially of $SiO_2$ and sodium carbonate in molecular proportions ranging from about 2:1 to 1:2; the said mixture normally forming a melt when rapidly heated to a temperature of about 850°; heating said mixture to temperatures somewhat below 850° C. for a time sufficient to volatilize a substantial amount of $CO_2$ and then continuing the heating at temperatures rising substantially above 850° C. until substantially all of the $CO_2$ is volatilized and the mixture is substantially all converted into a sodium silicate product, the time-temperature relationship of said heating procedure being such that none of the ingredients of the reaction mixture fuse during the process and that a porous product of non-vitreous appearance is produced.

2. In the manufacture of alkali metal silicates, the process which comprises making a mixture of silica and an alkali metal sulfate, the sulfur content of which is capable of being eliminated by volatilization during the process at temperatures below the fusion point of said sulfate, said volatilization resulting in the raising of the temperature at which a melt will form, in molecular proportions ranging from about 2:1 to 1:2; said mixture normally forming a melt when heated to temperatures in the neighborhood of the melting point of said sulfate; heating said mixture in the presence of a reducing agent to temperatures somewhat below said melting point until a substantial elimination of sulfur has occurred, then continuing the heating at temperatures above said melting point until the reaction between said silica and said sulfate is substantially completed and the sulfur content of said sulfate is substantially eliminated, the time-temperature relationship of said heating procedure being such that none of the ingredients of the reaction mixture fuse during the process and that a porous product of non-vitreous appearance is produced.

3. The process of claim 2 wherein said alkaline metal sulfate is sodium sulfate and the product formed is a sodium silicate.

4. In the production of alkaline metal silicates, the process which comprises mixing together silica sand with an alkaline metal salt having a melting point which is lower than the melting point of the sand and lower than that of the silicate product to be produced, in molecular proportions within the range of about $2SiO_2$:1 alkaline metal oxide to $1SiO_2$:2 alkaline metal oxide, said alkaline metal salt having an acid radical which is capable of being volatilized during the course of the reaction thereby raising the temperature at which the reaction mixture will form a melt, heating the resulting mixture under conditions producing a uniform distribution of temperature through said mixture, the substantially complete elimination of said acid radical and the formation of an alkaline metal silicate, the heating temperature at the start of the process being maintained below the fusion temperature of said alkaline metal salt until a substantial portion of said acid radical has been volatilized the heating temperature then being raised above said fusion temperature to complete the reaction but being maintained throughout the process below temperatures producing any substantial fusion of any of the ingredients of the reaction mixture, whereby a porous silicate product of non-vitreous appearance is produced.

5. In the manufacture of alkali metal silicates, the process which comprises mixing a charge of sand and an alkali metal salt having an acid radical capable of being volatilized during the process whereby the temperature is raised at which the charge will form a melt, heating said charge to reactive temperatures sufficiently high to volatilize said acid radical but below temperatures producing any visible vitrification of the reaction mixture, for a time sufficient to produce a substantial amount of water soluble silicate, dissolving the soluble silicate from the resulting product and returning the insoluble residues for use in a repetition of the process, the temperatures reached during said heating step exceeding those normally producing the formation of a melt but such formation being avoided by progressive volatilization of said acid radical as the temperature is raised.

6. In the manufacture of sodium silicates, the process which comprises mixing a substantial charge comprising silica and an alkali metal salt containing a volatile acid radical selected from a group consisting of sodium carbonate and sodium sulfate in molecular proportions ranging from about $2SiO_2:1Na_2O$ to $1SiO_2:2Na_2O$, heating said mixture at a temperature below the melting point of said salt until a substantial volatilization of said acid radical has taken place, thereby raising the temperature at which said mixture will form a melt, then increasing the heating temperature gradually and substantially in proportion to the rate of evolution of said acid radical to temperatures in the neighborhood of 1000° C., the heating being conducted under conditions producing a uniform distribution of temperature throughout said charge and the substantially complete elimination of said acid radical, the time-temperature relationship of said heating procedure being such that none of the ingredients of the charge appear to fuse during the process and that a porous sodium silicate of non-vitreous appearance is produced.

7. In the manufacture of alkali metal silicates, the process which comprises heating and reacting a substantial charge comprising silica sand and an alkali metal salt having a melting point below that of sand and below that of the silicate product produced in the process and containing an acid radical capable of being volatilized during the process, said volatilization resulting in the raising of the temperature at which the charge will form a melt, the substantial elimination of said acid radical and the formation of an alkali metal silicate, mixing said charge and adding sufficient of said alkali metal salt during said heating to produce a molecular ratio of sand and alkali meta-oxide ranging from about 2:1 to 1:2, the temperature of the mixture during said heating step being maintained below the fusion point of the alkali metal salt until a substantial portion of the said acid radical has been volatilized therefrom, the temperature eventually being raised substantially above said fusion point and sufficiently high to substantially eliminate said acid radical; the rate of addition of said alkali metal salt and the time-temperature relationship of said heating procedure being such that none of the ingredients of the charge appear to fuse during the process and that a porous alkali metal silicate product of non-vitreous appearance is produced.

8. In the manufacture of silicates, the process which comprises preparing a substantial charge comprising silica sand, calcium carbonate and sodium carbonate; the ingredients of said charge being so proportioned that said charge tends to form a melt when rapidly heated to a temperature above the fusion point of sodium carbonate, the volatilization of carbon dioxide from said charge resulting in the raising of the temperature at which such a melt will form; heating and reacting said charge under conditions producing the substantial elimination of carbon dioxide from the charge and the formation of a product containing a mixture of sodium and calcium silicates useful in glass making; the temperature of the charge during said heating step being maintained below the fusion point of sodium carbonate until a substantial portion of the said carbon dioxide has been volatilized therefrom, the temperature then being raised, as the temperature at which the charge will form a melt is raised, above the fusion point of said sodium carbonate sufficiently high to substantially eliminate carbon dioxide from said charge; the time-temperature relationship of said heating being such that none of the ingredients of the charge appear to fuse during the process and that a porous silicate product of non-vitreous appearance is produced.

9. In the manufacture of alkali metal silicates, the process which comprises heating, agitating and reacting a substantial charge comprising silica sand and an alkali metal salt having a melting point which is lower than the melting point of the sand and lower than that of the silicate product to be produced in the process, the charge containing silica and alkali metal oxide in molecular proportions ranging from about 2:1 to 1:2, said charge having a tendency to form a melt when heated rapidly to a temperature above the melting point of said alkali metal salt, said alkali metal salt having an acid radical which is capable of being volatilized during the course of the reaction thereby raising the temperature at which such a melt will form, the temperature of the charge during the heating step being maintained below the melting point of said alkali metal salt until a substantial portion of the said acid radical has been volatilized therefrom, the temperature then being progressively raised, as the temperature at which the charge will form a melt is raised during the course of the reaction, above the melting point of said alkali metal salt but being maintained throughout the process below temperatures producing the formation of any visible melt in the charge, thereby substantially completing the volatilization of said acid radical and producing a porous alkali metal silicate which appears to be free from vitrified material.

10. In the manufacture of sodium metasilicate, the process which comprises forming a substantial charge comprising a substantially equi-molecular mixture of sodium carbonate and silica sand, heating and reacting said charge, under conditions producing a uniform distribution of temperature throughout said charge, to temperatures which are maintained below the melting point of the sodium carbonate until after a substantial portion of the $CO_2$ in the charge has been volatilized, thereby raising the temperature at which the charge will form a melt, the temperatures being then raised progressively, as the temperature at which the charge will form a melt is raised during the course of the reaction, substantially above the melting point of the sodium carbonate but being maintained throughout the process below temperatures producing the formation of any visible melt in the charge, thereby substantially completing the volatilization of the $CO_2$ in the charge and producing a porous, sodium metasilicate which appears to be free from vitrified material.

11. In the manufacture of carbonate-free solutions of sodium silicates, the process which comprises forming a substantial charge comprising a mixture of sodium carbonate and silica sand containing $SiO_2$ and $Na_2O$ in molecular proportions ranging from about 2:1 to 1:2, heating and reacting said charge, under conditions producing a uniform distribution of temperature throughout the charge, to temperatures which are maintained below the melting point of sodium carbonate until after a substantial portion of the $CO_2$ in the charge has been volatilized, thereby raising the temperature at which the charge will form a melt, and which are then raised progressively, as the temperature at which the charge will form a melt is raised during the course of the reaction, above the melting point of the sodium carbonate but being maintained throughout the process below temperatures producing the formation of any visible melt in the charge, thereby substantially completing the volatilization of the $CO_2$ in the charge, then dissolving the resulting porous sodium silicate in water to a concentration above 20 per cent by weight, and separating any precipitated sodium carbonate from the solution.

12. As new compositions of matter, porous calcination products having a non-vitreous appearance comprising an alkali metal silicate having a molecular ratio of $SiO_2$ to alkali metal oxide ranging from about 2:1 to 1:2, said products containing finely-divided, interlocked crystals of an anhydrous alkali metal silicate giving the product an opaque appearance, the larger granules being oölitic in appearance, the granules consisting largely of crystals of sodium metasilicate, in the form of dendrites radiating from common centers like the seeds of a cockle-bur, said common centers consisting of a silicate glass, the more siliceous of said products also containing crystals of alkali metal disilicate, said products being readily and substantially completely soluble in water and having an apparent density ranging from about 0.6 to 1 when sufficiently fine to pass a 65 mesh screen.

13. As a new composition of matter, a sodium metasilicate calcination product in a porous form and having a non-vitreous appearance containing finely-divided, interlocked crystals of sodium metasilicate giving the product an opaque appearance, the larger granules being oölitic in appearance, the granules consisting largely of crystals of sodium metasilicate in the form of dendrites radiating from common centers like the seeds of a cockle-bur, said common centers consisting of a silicate glass, said products being readily and substantially completely soluble in water and having an apparent density ranging from about 0.6 to 1 when sufficiently fine to pass a 65 mesh screen.

14. As a new composition of matter, a silicate calcination product containing a mixture of sodium and calcium silicates in a porous form and having a non-vitreous appearance, the sodium silicate in said product having a ratio of $SiO_2$ to $Na_2O$ ranging from about 2:1 to 1:2 and consisting mostly of finely-divided, interlocked crystals of anhydrous sodium metasilicate giving the product an opaque appearance, the larger granules being oölitic in appearance, the granules consisting largely of said crystals in the form of dendrites radiating from common centers like the seeds of a cockle-bur, said common centers consisting of a silicate glass, said composition having an apparent density ranging from about 0.6 to 1 when sufficiently fine to pass a 65 mesh screen.

DANIEL B. CURLL, JR.

CERTIFICATE OF CORRECTION.

Patent No. 2,239,880.                                        April 29, 1941.

DANIEL B. CURLL, JR.

It is hereby certified that error appears in the printed specification of the above numbered patent requiring correction as follows: Page 1, second column, line 28, for "SioO$_2$" read --SiO$_2$--; page 2, first column, line 27, for "mixture" read --mixtures--; page 4, first column, line 29, for "2SiO" read --2SiO$_2$--; same page, second column, line 54, for "rection" read --reaction--; page 9, first column, line 72, claim 4, for the word "through" read --throughout--; and that the said Letters Patent should be read with this correction therein that the same may conform to the record of the case in the Patent Office.

Signed and sealed this 17th day of June, A. D. 1941.

(Seal)                                                                              Henry Van Arsdale,
Acting Commissioner of Patents.